Patented June 17, 1941

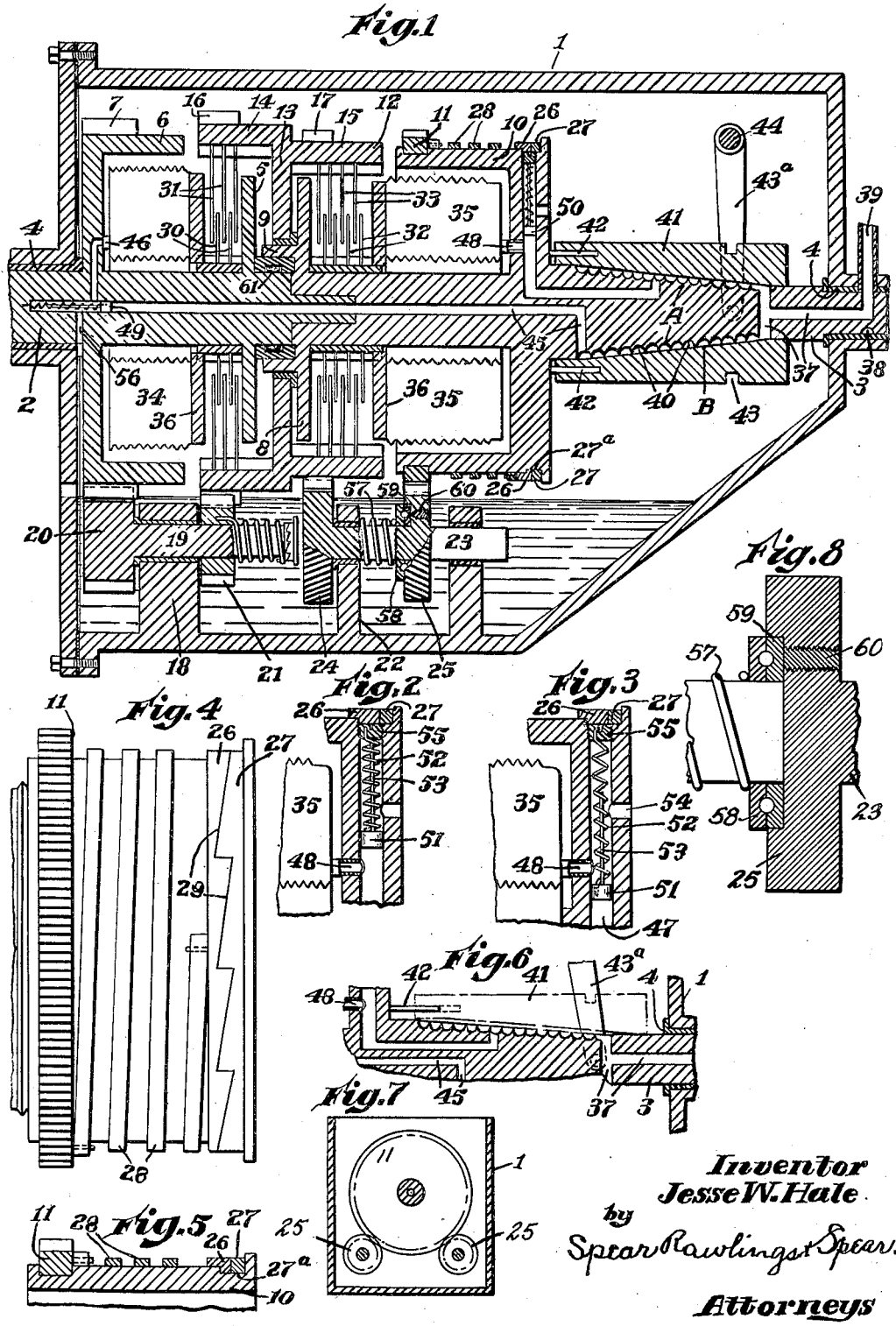

2,245,857

BEST AVAILABLE COPY

UNITED STATES PATENT OFFICE 2,245,857

CHANGE SPEED DEVICE

Jesse W. Hale, Newton, Mass.

Application April 9, 1937, Serial No. 135,902

8 Claims. (Cl. 74—336.5)

My present invention relates to a novel device by which drive and driven shafts may be connected at ratios determined by driven shaft speeds and as required by operating conditions.

The problem of automatic changing of gear ratios between drive and driven shafts has received considerable attention due to the many advantages which such device makes possible, particularly when the device, while automatic in changing gear ratios, is subject to control by the operator as required by operating conditions.

In the drawing I have shown an embodiment of my invention from which and the accompanying specification the advantages of my present invention may be readily understood. In the drawings:

Fig. 1 is a section through my device.

Fig. 2 is a fragmentary sectional view of a valve in control of the fluid positioned to actuate the clutch.

Fig. 3 is a view similar to Fig. 2 showing the valve in position to relieve the pressure from the clutch.

Fig. 4 is an enlarged view of a one-way clutch.

Fig. 5 is a fragmentary sectional view of the clutch shown in Fig. 4.

Fig. 6 is a fragmentary view of the pressure generating member moved from its position shown in Fig. 1.

Fig. 7 is a diagrammatic view of a modification in cross section of my invention, and Fig. 8 is a fragmentary view of the structure utilized to equalize tooth pressures.

The casing 1 has aligned ports for the drive shaft 2 and the driven shaft 3. Bushings are indicated at 4.

The drive shaft 2 is provided, adjacent its inner end, with a flange 5 and also carries a rim member 6 presenting an annular recess disposed towards the flange 5. The member 6 includes a gear 7.

The driven shaft 3 includes a flange 8 including a rim 9. The driven shaft 3 carries a rim member 10 presenting an annular recess disposed towards the flange 8. A gear 11 is loosely mounted in a groove 12 in the rim member 10.

An intermediate member 13 is mounted on the rim 9 for rotation independently thereof and includes rim portions 14 and 15 presenting annular recesses disposed towards the annular recesses of the rim members 6 and 10, respectively. The rim portions 14 and 15 include gears 16 and 17, respectively.

At 18 I have shown a bracket secured to the casing 1 which supports the shaft 19 carrying idler gear assembly 20 and 21 in mesh with the gears 7 and 16, respectively. At 22 I have shown brackets supporting the shaft 23 carrying idler gear assembly 24 and 25 in mesh with the gears 17 and 11, respectively.

As will be subsequently explained, when the intermediate member 13 rotates at the same speed as the drive shaft 2 and when the driven shaft 3 and the intermediate member 13 rotate at the same speed, the gears of the idler assembly meshing with the gears 16 and 11 on the intermediate member 13 and on the rim member 10, cannot rotate at the same speed, as the idlers are of different sizes. Consequently, in order to prevent locking, either the driving idler gear member, under these circumstances, must be capable of being rotated independently of its shaft, or the driven gear must be capable of permitting independent rotation of the member which it rotates.

In Fig. 1 I have shown both constructions as the gear 21 is loosely mounted on its shaft 19 and the gear 11 is loosely mounted on the rim member 10. As the one-way clutches to lock the gears to the members on which they are loosely mounted are identical in either case, and either construction may be used, a description of the one-way clutch locking the gear 11 to the rim member 10 as shown in Figs. 4 and 5 will be sufficient to enable the one-way clutch to be fully understood.

Ring members 26 and 27 are loosely mounted in a groove 27a in the rim member 10. The ring 26 is connected to the gear 11 by a spring 28 spirally disposed about the rim member 10 to act as a coil clutch. The ring members 26 and 27 have inclined surfaces 29 which, when the idler gear 25 is rotated to drive the rim member 10 are wedged apart to lock in the groove 27a and thus tighten the coil clutch 28 gradually to rotate the member 10 with the gear 11.

When, as will be later explained, the rim member 10 is locked to rotate with the intermediate member 13, the rotation of the rim member 10 will free the interlock of the ring members 26 and 27 and thus release the coil clutch 28 to permit the free rotation of the rim member 10 within the gear 11.

Clutch plates 30 and 31 are slidably mounted on the drive shaft 2 and the rim portion 14, respectively, establishing a clutch to lock the intermediate member 13 to the drive shaft 2. Clutch plates 32 and 33 are slidably mounted on the driven shaft 3 and the rim portion 15 establishing a clutch to lock the intermediate member 13 to the driven shaft 3.

Within the annular spaces presented by the rim members 6 and 10, I position annular pressure operable expansible members 34 and 35, respectively, of the well known Sylphon bellows type. Each of the expansible members 34 and 35 includes a contact ring 36 to slide the clutch plates against the adjacent shaft flange.

The driven shaft 3 is formed with a taper A adjacent the rear end of which is a conduit 37 extending axially through the shaft and in communication with a ring-shaped groove 38 which receives fluid under a fixed pressure through the inlet 39 from a suitable source of pressure, such as the crankcase (not shown). The tapered portion A of the driven shaft 3 is formed with grooves 40 spiralling towards the forward part of the tapered portion A.

A casing 41 fits the driven shaft 3 on each end of the tapered portion A and is interiorly formed as at B with the same taper as that of the driven shaft 3 at A, as shown in Fig. 1. The casing 41 is slidable relative to the driven shaft 3 being mounted on pins 42 carried by the rim member 10 to ensure its rotation with the shaft 3. A groove 43 in the casing 41 receives the ends of a fork 43ª carried by a shaft 44 through the casing 1 which may be actuated by the operator to move the casing 1 rearwardly as shown in Fig. 6, to modify the clearance between the casing or stem 41 and the spiral grooves 40 and to vary effectiveness of the spiral grooves 40 to develop the necessary pressure for purposes later to be described.

A conduit 45 extends from the inner end of the tapered portion A through the shafts 3 and 2 and through the rim member 6 where it is provided with an outlet port 46 to the expansible member 34. A conduit 47 extends from substantially the middle of taper A through the drive shaft 3 and the rim member 10 and is there provided with an outlet port 48 to the expansible member 35.

The conduits 45 and 47 are provided with valves 49 and 50, respectively. The valves 49 and 50 are substantially identical, the valve 50 being shown in detail in Fig. 2. A valve member 51 under the influence of a spring 52 normally is positioned in the conduit 47 to close the flow of fluid through the outlet 48. When the resistance of the spring 52 is overcome, fluid is admitted to the Sylphon bellows 35 while the valve stem 53 limits the movement of the valve 51 to prevent the relief port 54 being connected to the pressure delivery conduit 47. Fluid may pass through the relief port 54 when the compressible member 52 overcomes the fluid pressure and carries the valve 51 to a position closing the conduit 47 from the outlet 48 and connecting the outlet 48 to the relief port 54. A plug 55 is adjustably threaded in the conduit 47 to permit the resistance of the spring 52 to be varied. I have indicated the relief port for the valve 49 at 56. Fluid may return to its source through an outlet R in the casing 1.

Because with the use of idler gears establishing a desired gear ratio, the torque is greatest on the driving idler gear (such as the gears 21 and 25) the load on the gear teeth may present a serious problem. To avoid excessive loads on the teeth of such gears, the number of idler gears employed may be increased as shown in Fig. 7, but in order to render this solution of the problem effective, means must be employed to ensure that the pressures are evenly distributed among the several idler gears to offset inaccuracies in tooth alignment.

In accordance with my invention, the equalizing of the tooth pressures results from the fact that the idler gears 24 and 25 are carried by a slidable shaft 23 with a spring 57 exerting a predetermined pressure effective to move the shaft 23 to the right as viewed in Fig. 1. Assuming that two sets of idler gears are employed as indicated in Fig. 7 and that the gears in each set are formed to establish predetermined thrusts that may be more or less mutually opposed, and the springs 57 oppose a predetermined tooth pressure, if that predetermined pressure is exceeded on one driving idler gear its shaft 23 is moved to the left carrying the gear 25 with it so that the tooth pressures of tooth sets of idler gears become equalized.

The end thrust is opposed by a spring 57 between which and the idler gear 25 are a pair of wear rings 58 and 59 such as any ordinary commercial thrust bearing. The tension may be adjusted by means of the screws 60 which move the thrust bearing against the spring to increase its tension.

In operation it will be assumed for purposes of explanation only that my invention is embodied in a motor vehicle which is at rest and that the main clutch, not shown, is engaged.

The drive shaft 2 rotates the intermediate member 13 at a ratio determined by the gears 7, 20, 21 and 16, which ratio may be assumed to be 2:1. The driven shaft is rotated by the intermediate member 13 at a ratio determined by the gears 17, 24, 25 and 11, which ratio may be assumed to be 2:1 with the resulting ratio between the shafts 2 and 3 of 4:1 or a suitable low speed. The gear 21, on rotation of the gear 20 and the shaft 19, is locked to the shaft 19 by the one-way clutch since the wedging rings 26 and 27 spread and lock in the groove 27ª. The spring 28 is then tightened by the rotation of the shaft 19 so that the gear 21 is locked thereon. It will be understood that the one-way clutch locking the gear 21 to the shaft 19 is identical to the one-way clutch locking the gear 11 to the rim member 10.

The rotation of the spiral grooves 40 impells the fluid along the grooves 40 with an increase in pressure depending on the driven shaft 3 and the position of the casing 41 relative to the grooves 40.

When a sufficient pressure is built up to actuate the valve 49, fluid under pressure is admitted to the expansible member 34 actuating the clutch plates 30 and 31 to lock the intermediate member 13 to the drive shaft 2. As there is now no gear reduction possible between the member 13 and the shaft 2, the one-way clutch connecting the gear 21 to its shaft 19 is released permitting the gear 21 to rotate independently thereof. The ratio between the drive shaft 2 and the driven shaft 3 will now be 2:1 or a suitable intermediate speed.

Further increase of driven shaft speed will result in increased pressure of the fluid in the grooves 40 until a sufficient pressure exists in the conduit 47 to actuate the valve 50 to admit fluid pressure to the expansible member 35 to actuate the clutch plates 32 and 33 to lock the intermediate member 13 to the driven shaft 3 effecting direct drive, the one-way clutch previously locking the gear 10 to the rim member 11 now being released. Since the valve 50 must be actuated subsequent to the valve 49, the conduit 47 communicates with the middle of the taper A where a lesser pressure exists requiring a higher speed to develop the same pressure.

If the position of the casing 41 be varied and clearance exists between the casing 41 and the grooves 40 greater driven shaft speeds are required to develop desired operating pressure so that the gear ratio changes while automatically effected may be dominated as required by the operating conditions.

It will be appreciated that the nature of the expansible members 34, 35 is such that the pressure on the clutch plates is very quickly reduced when pressures thereon are released. It will also be appreciated that the one-way clutches are effective to cushion the shock of load assumption.

At 61 I have indicated a one-way clutch between the rim 9 and the drive shaft 2 which may be used to prevent "free wheeling" and to permit the drive shaft 2 and the driven shaft 3 to be rotated reversedly should a reversing unit be placed forwardly of the casing 1.

What I therefore claim and desire to secure by Letters Patent is:

1. In a change speed device, a casing, a drive shaft, a driven shaft and an intermediate member mounted for rotation independently of said shafts, clutches to lock said intermediate member to said drive shaft and to said driven shaft, idler assemblies connecting said intermediate member to said drive shaft and to said driven shafts, each of said assemblies including idler gears supported by said casing, means to actuate said clutches, means to render each of said assemblies inoperative when the corresponding clutch is actuated, and means to lock said driven shaft to said drive shaft to prevent rotation of said driven shaft faster than said drive shaft.

2. In a change speed device, a casing, a drive shaft, a driven shaft and an intermediate member mounted for rotation independently of said shafts, clutches to lock said intermediate member to said drive shaft and to said driven shaft, idler assemblies connecting said intermediate member to said drive shaft and to said driven shafts, each of said assemblies including idler gears supported by said casing, fluid pressure operated means responsive to the speed of said driven shaft to actuate said clutches, and means to render each of said assemblies inoperative when the corresponding clutch is actuated.

3. In a change speed device, a casing, a drive shaft, a driven shaft and an intermediate member mounted for rotation independently of said shafts, clutches to lock said intermediate member to said drive shaft and to said driven shaft, idler assemblies connecting said intermediate member to said drive shaft and to said driven shafts, each of said assemblies including idler gears supported by said casing, fluid pressure operated means to actuate said clutches, means responsive to speed of the driven shaft to control said fluid pressure, and means to render each of said assemblies inoperative when the corresponding clutch is actuated.

4. In a change speed device, a casing, a drive shaft, a driven shaft and an intermediate member mounted for rotation independently of said shafts, clutches to lock said intermediate member to said drive shaft and to said driven shaft, idler assemblies connecting said intermediate member to said drive shaft and to said driven shafts, each of said assemblies including idler gears supported by said casing, fluid pressure operated means to actuate said clutches, means responsive to the speed of the driven shaft to control said fluid pressure, means to vary the action of said control means, and means to render each of said assemblies inoperative when the corresponding clutch is actuated.

5. In a change speed device, a drive shaft, a driven shaft, fluid pressure operated means to connect said shafts at different ratios, a source of fluid, means to deliver said fluid to said fluid pressure operated means at pressures determined by driven shaft speeds, said pressure delivery means comprising a tapered driven shaft portion having a spirally disposed groove, a casing slidably mounted on said driven shaft, said casing being tapered to fit said tapered portion, and means to slide said casing to vary the clearance between said casing and said groove.

6. In a change speed device, a drive shaft, a driven shaft, means to connect said shafts at different ratios, said means including a pair of fluid pressure actuated clutches, a source of fluid, pressure creating means delivering fluid to said clutches successively at pressures dependent on driven shaft speed, said delivery means comprising a tapered driven shaft portion having a spirally disposed groove forming an impeller, a casing slidably mounted on said shaft enclosing said impeller and being formed with an internal taper to fit said impeller, a conduit from said source to the small end of said impeller, a delivery conduit from the other end of said impeller to one of said clutches, a second delivery conduit to the second of said clutches.

7. In a change speed device, a drive shaft, a driven shaft, means to connect said shafts at different ratios, said means including a pair of fluid pressure actuated clutches, a source of fluid, pressure creating means delivering fluid to said clutches successively at pressures dependent on driven shaft speed, said delivery means comprising a tapered driven shaft portion having a spirally disposed groove forming an impeller, a casing slidably mounted on said shaft enclosing said impeller and being formed with an internal taper to fit said impeller, a conduit from said source to the small end of said impeller, a delivery conduit from the other end of said impeller to one of said clutches, a second delivery conduit to the second of said clutches, and a pressure operating valve in each delivery conduit.

8. In a change speed device, a drive shaft, a driven shaft, means to connect said shafts at different ratios, said means including a pair of fluid pressure actuated clutches, a source of fluid, pressure creating means delivering fluid to said clutches successively at pressures dependent on driven shaft speed, said delivery means comprising a tapered driven shaft portion having a spirally disposed groove forming an impeller, a casing slidably mounted on said shaft enclosing said impeller and being formed with an internal taper to fit said impeller, a conduit from said source to the small end of said impeller and a delivery conduit from the other end of said impeller to one of said clutches, a second delivery conduit to the second of said clutches, a pressure operating valve in each delivery conduit, and means to vary the clearance between said casing and said grooves to vary the effectiveness of the pressure creating delivery means.

JESSE W. HALE.